(12) United States Patent
Breault

(10) Patent No.: US 6,682,835 B2
(45) Date of Patent: Jan. 27, 2004

(54) METHOD AND APPARATUS FOR INCREASING THE OPERATIONAL EFFICIENCY OF A FUEL CELL POWER PLANT

(75) Inventor: Richard D. Breault, North Kingstown, RI (US)

(73) Assignee: UTC Fuel Cells, LLC, South Windsor, CT (US)

( * ) Notice: Subject to any disclaimer, the term of this patent is extended or adjusted under 35 U.S.C. 154(b) by 352 days.

(21) Appl. No.: 09/748,037

(22) Filed: Dec. 22, 2000

(65) Prior Publication Data

US 2002/0127443 A1 Sep. 12, 2002

(51) Int. Cl.[7] .............................................. H01M 8/04
(52) U.S. Cl. .......................... 429/13; 429/25; 429/38; 429/39
(58) Field of Search ......................... 429/13, 25, 38, 429/39

(56) References Cited

U.S. PATENT DOCUMENTS

| | | | |
|---|---|---|---|
| 4,769,297 A | | 9/1988 | Reiser et al. |
| 4,973,530 A | * | 11/1990 | Vanderborgh et al. ........ 429/30 |
| 5,064,732 A | | 11/1991 | Meyer |
| 5,252,410 A | * | 10/1993 | Wilkinson et al. ............ 429/26 |
| 5,256,499 A | * | 10/1993 | Minh et al. ................. 29/623.3 |
| 5,300,370 A | * | 4/1994 | Washington et al. .......... 429/34 |
| 5,503,944 A | | 4/1996 | Meyer et al. |
| 5,641,586 A | * | 6/1997 | Wilson ........................ 429/30 |
| 5,700,595 A | | 12/1997 | Reiser |
| 6,124,054 A | * | 9/2000 | Gorman et al. ................ 429/17 |
| 6,207,312 B1 | * | 3/2001 | Wynne et al. ................. 429/13 |
| 6,432,566 B1 | * | 8/2002 | Condit et al. ................. 429/17 |

\* cited by examiner

*Primary Examiner*—Patrick Ryan
*Assistant Examiner*—Gregg Cantelmo
(74) *Attorney, Agent, or Firm*—McCormick, Paulding & Huber LLP

(57) ABSTRACT

A method and apparatus for increasing the operational efficiency of a fuel cell power plant including a cell stack assembly having a plurality of fuel cells in electrical communication with one another, each of the fuel cells including an anode substrate in fluid communication with an anode flow field plate. The proposed method includes forming a fuel channel in the anode flow field plate, providing a fuel stream to a fuel channel and interrupting the fuel channel at a location along the fuel channel so that the fuel stream is directed to permeate the anode substrate before being exhausted from the fuel cells.

18 Claims, 5 Drawing Sheets

METHOD AND APPARATUS FOR INCREASING THE OPERATIONAL EFFICIENCY OF A FUEL CELL POWER PLANT

CROSS REFERENCE TO RELATED APPLICATION

The subject matter of the present invention is closely related to commonly assigned, pending U.S. patent application No. 09/704,891, filed on Nov. 2, 2000, and hereby incorporated by reference in its entirety.

FIELD OF THE INVENTION

This invention relates in general to a method for increasing the operational efficiency of a fuel cell power plant, and deals more particularly with a method and apparatus for providing a fuel cell power plant with a reactant stream which increases the utilization of the reactant stream, thereby increasing the performance of the fuel cell power plant as a whole.

BACKGROUND OF THE INVENTION

Electrochemical fuel cell assemblies are known for their ability to produce electricity and a subsequent reaction product through the interaction of a reactant fuel being provided to an anode electrode substrate and a reactant oxidant being provided to a cathode electrode substrate, generating an external current flow there-between. Such fuel cell assemblies are very useful due to their high efficiency, as compared to internal combustion fuel systems and the like, and may be applied in many fields. Fuel cell assemblies are additionally advantageous due to the environmentally friendly chemical reaction by-products, typically water, which are produced during their operation. Owing to these characteristics, amongst others, fuel cell assemblies are particularly applicable in those fields requiring highly reliable, stand-alone power generation, such as is required in space vehicles and mobile units including generators and motorized vehicles.

Typically, electrochemical fuel cell assemblies employ a hydrogen-rich gas stream as a fuel and an oxygen-rich gas stream as an oxidant, whereby the resultant reaction by-product is water. Such fuel cell assemblies may employ a membrane consisting of a solid polymer electrolyte, or ion exchange membrane, disposed between the anode and cathode electrode substrates formed of porous, electrically conductive sheet material—typically, carbon fiber paper. One particular type of ion exchange membrane is known as a proton exchange membrane (hereinafter PEM), such as sold by DuPont under the trade name NAFION™ and well known in the art. Catalyst layers are formed between the PEM and each electrode substrate to promote the desired electrochemical reaction. The catalyst layer in a fuel cell assembly is typically a carbon supported platinum or platinum alloy, although other noble metals or noble metal alloys may be utilized. In order to control the temperature within the fuel cell assembly, a water coolant is typically provided to circulate about the fuel cell assembly. In certain fuel cell configurations, flow field plates are disposed on either side of the anode and cathode substrates and may include channels formed therein for accommodating the respective flows of reactant fuel and oxidant. The flow field plates may be additionally adapted to include coolant channels for circulating the water coolant about the fuel cell assembly.

In the typical operation of a PEM fuel cell assembly, a hydrogen rich fuel permeates the porous electrode material of the anode and reacts at the catalyst layer to form hydrogen ions and electrons. The hydrogen ions migrate through the PEM to the cathode electrode while the electrons flow through an external circuit connected to a load. At the cathode electrode, the oxygen-containing gas supply also permeates through the porous substrate material and reacts with the hydrogen ions and the electrons from the anode electrode at the catalyst layer to form the by-product water. Not only does the PEM facilitate the migration of these hydrogen ions from the anode to the cathode, but the ion exchange membrane also acts to isolate the hydrogen rich fuel from the oxygen-containing oxidant gas. The reactions taking place at the anode and cathode catalyst layers may be represented by the following equations:

Anode reaction $H_2 \rightarrow 2H^+ + 2e$

Cathode reaction: $\frac{1}{2} O_2 + 2H^+ + 2e \rightarrow H_2O$

In practical applications, a plurality of planar fuel cell assemblies are typically arranged in a stack, commonly referred to as a cell stack assembly. The cell stack assembly may be surrounded by an electrically insulating housing that defines the various manifolds necessary for directing the flow of a hydrogen-rich fuel and an oxygen-rich oxidant to the individual fuel cell assemblies, as well as a coolant stream, in a manner well known in the art. A fuel cell power plant may typically be comprised of the cell stack assembly, reactant storage vessels, reactant control valves, reactant flow devices, coolant pumps, heat exchangers, coolant degassifiers or demineralizers, sensors for measuring reactant concentrations, temperatures, pressures, current, voltage, and a microprocessor that controls the operation of the fuel cell power plant.

As will be appreciated by one so skilled in the art, tying these differing components into a cohesive fuel cell power plant operating within specific design parameters results in a complex and oftentimes cumbersome structure.

Specifically, the operating efficiency of a fuel cell power plant is directly related to the utilization of the reactant fuel stream supplied to the fuel cell assemblies making up the fuel cell power plant. This utilization, commonly referred to as 'hydrogen utilization', due to the use of a hydrogen-rich fuel stream in fuel cell applications, is the ratio of reactant fuel consumed at the anode electrode of the fuel cells, divided by the total quantity of reactant fuel supplied to the fuel cells multiplied by 100. While PEM fuel cell power plants are designed to come as close as possible to 100% utilization, this is practically unfeasible.

Current generation PEM fuel cells frequently use thin polymer membranes on the order of approximately 15 microns thick to maximize cell performance of approximately 1000 amps per square foot (ASF). A certain measure of the hydrogen utilized as fuel within these fuel cells will diffuse across this thin membrane from the anode electrode to the cathode electrode to react with the oxygen-rich oxidant to form water. Likewise, oxygen also tends to diffuse across this thin membrane to combine with hydrogen to form water. The combination of these effects is to reduce the available hydrogen capable of reacting at the anode electrode of the fuel cells and hence, reduces the utilization rate of the fuel cell power plant as a whole.

It is common for typical fuel cell power plants to be operated by supplying a reactant fuel to the integrated cell stack assembly using either a cascade or multiple-pass approach, wherein the individual fuel cells in the cell stack assembly are separated in two or more groups. The reactant fuel is supplied to the first group of fuel cells and then cascades to the next group and so on until exiting from the cell stack assembly through a fuel exhaust manifold. With such an arrangement, the practical hydrogen utilization has been found to be as high as 90% or more for the overall cell stack assembly, with individual cascade groups operating at approximately 60–70% utilization.

Many different flow orientations have, however, been utilized in fuel cells wherein the objective is always to distribute the hydrogen flow such that every section of the fuel cell receives the required quantity of fuel while maintaining a high hydrogen utilization rate. Known flow configurations that have been used within fuel cells are single pass, two pass, multi-passes, serpentine and interdigitated. An external recycle is oftentimes used between the cell exit and the cell inlet to improve flow uniformity within the cell stack assembly.

Regardless of the flow configurations utilized, a primary factor in maintaining a high hydrogen utilization rate resides in maintaining a proper pressure drop between the reactant fuel inlet and fuel exhaust, in conjunction with regulating the flow rate of the reactant fuel. In this respect, the multi-pass or serpentine flow configurations employ relatively narrow and elongated fuel channels operated under high flow rates to maintain the required pressure differential between the fuel input to the fuel exhaust. Similarly, the interdigitated flow configuration utilizes pairs of typically narrow fuel channels whereby fuel is provided to one of the fuel channels having a closed end and exhausted through the adjoining fuel channel after traveling through the anode substrate. In such a manner, the interdigitated flow configuration also utilizes high reactant flow rates and an extended flow path for the reactant fuel to ensure the pressure differential necessary for efficient hydrogen utilization.

It will be readily appreciated that equipping fuel cells with a fuel delivery flow field comprised of uniform, narrow, elongated fuel channels, such as those noted above, requires manufacturing tolerances which are oftentimes difficult and costly to adhere to. Moreover, plural or elongated fuel channels complicate the humidification of the fuel stream, which frequently leads to regional drying of the fuel cell and subsequent fuel cell failure.

With the forgoing problems and concerns in mind, the present invention therefore seeks to increase the hydrogen utilization for a fuel cell while enabling the use of single-pass fuel channels and relatively low reactant fuel flow rates, while concurrently reducing the complexity and demands made upon the fuel cell humidification system.

SUMMARY OF THE INVENTION

It is an object of the present invention to increase the operational efficiency of a fuel cell power plant.

It is another object of the present invention to increase the hydrogen utilization of a fuel cell power plant.

It is another object of the present invention to increase the hydrogen utilization of a fuel cell power plant while enabling more efficient fuel cell hydration.

It is another object of the present invention to increase the hydrogen utilization of a fuel cell power plant without the need for the recycling of exhausted fuel.

It is another aspect of the present invention to increase the hydrogen utilization of a fuel cell power plant while permitting the use of single-pass fuel delivery channels.

According to one embodiment of the present invention, a method and apparatus for increasing the operational efficiency of a fuel cell power plant includes a cell stack assembly comprised of a plurality of fuel cells in electrical communication with one another, each of the fuel cells including an anode substrate in fluid communication with an anode flow field plate. The proposed method includes forming a fuel channel in the anode flow field plate, providing a fuel stream to the fuel channel and interrupting the fuel channel at a location along the fuel channel so that the fuel stream is directed to permeate the anode substrate before being exhausted from the fuel cells.

These and other objectives of the present invention, and their preferred embodiments, shall become clear by consideration of the specification, claims and drawings taken as a whole.

DETAILED DESCRIPTION OF THE PREFERRED EMBODIMENT

The present invention is generally directed towards increasing the operational efficiency of a fuel cell power plant, wherein the reactant fuel stream provided to the power plant is typically a hydrogen-rich gas. It will be readily appreciated that the fuel cell power plant of the present invention is comprised of those components necessary to enable operation of, and electrical generation from, the fuel cell power plant, including but not limited to: a cell stack assembly comprising a plurality of electrically integrated planar fuel cells; reactant feed and exit manifolds for directing the reactant fuel and oxidant streams to and from the cell stack assembly; coolant channels or plates for circulating a coolant about the fuel cells during operation; various conduits, valves and contamination removal devices for controlling and cleansing the flow of reactants and coolants; and an integrated control system for monitoring the reactant flow rates and operating temperature of the fuel cell power plant so as to effectuate changes in these and other parameters, thereby maintaining the fuel cell power plant at approximately optimal operating conditions. It should also be noted that while the present invention is directed towards PEM fuel cell power plants, the present invention is not limited in this regard as the method and apparatus hereinafter disclosed is equally applicable to non-PEM fuel cells.

It is desirable to utilize approximately 90% or more of the hydrogen-rich fuel stream supplied to the fuel cells; that is, it is desirable to operate the cell stack assembly as a whole at approximately 90% or more fuel utilization. It has heretofore been known to supply a cell stack assembly with a reactant fuel stream utilizing either a cascaded, multiple-pass system or a single-pass system, wherein the reactant fuel stream in either system is provided to the cell stack assembly at continuous, yet variable, flow rates. These systems, however, periodically suffer from the debilitating effects of reactant fuel starvation or dilution, as well as having unacceptable levels of hydrogen utilization. In PEM fuel cells, it is not uncommon for the reactant fuel stream to be diluted by nitrogen diffusing across the ion exchange membrane, typically a NAFION™ membrane or the like.

Figure 1:
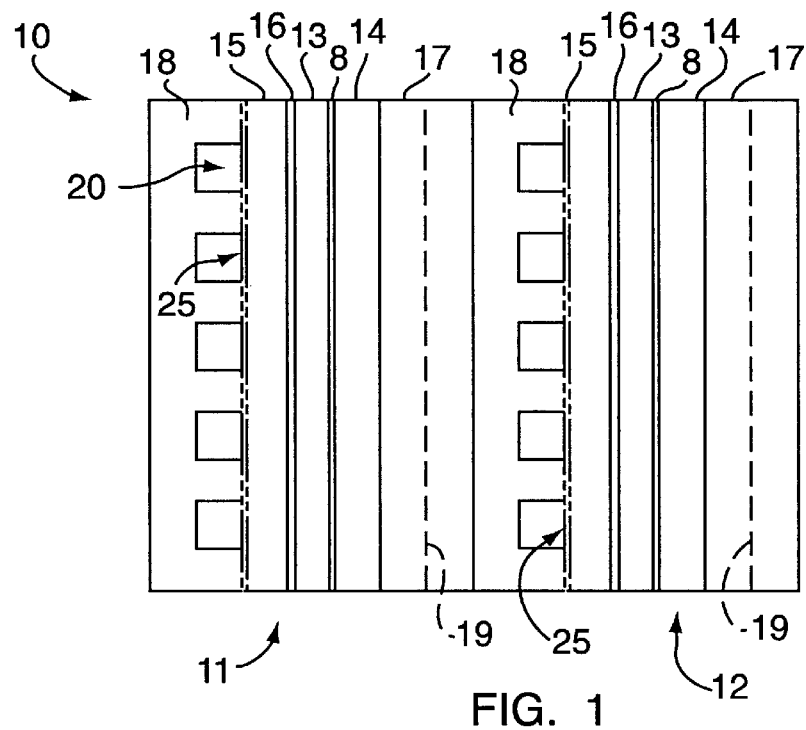
FIG. 1 is a partial cross-sectional view of a pair of fuel cell assemblies according to one embodiment of the present invention.

As part of an integrated fuel cell power plant, FIG. 1 illustrates a sectional view of a partial cell stack assembly 10, according to one embodiment of the present invention. The partial cell stack assembly 10 has two electrochemical fuel cell assemblies, 11 and 12, arranged in series contact. The fuel cells 11 and 12 each employ an ion exchange membrane 13 consisting of a solid polymer electrolyte disposed between an anode electrode substrate 15 and a cathode electrode substrate 14. The ion exchange membrane 13 is also referred to as a proton exchange membrane (PEM) and can be a plastic-type film approximately 0.001 inch thick. The anode and cathode electrode substrates 14 and 15 are formed of porous, electrically conductive sheet material—typically, carbon fiber paper having a Teflon® coating. Although a PEM ion exchange membrane has been described, the present invention is equally applicable to fuel cell assemblies utilizing alternative electrolytes, including known liquid electrolyte fuel cell assemblies.

The ion exchange membrane 13 has a catalyst layer formed on either side at the membrane-electrode interface so as to promote the desired electrochemical reaction. The anode catalyst 16 and the cathode catalyst 8 are typically chosen from one of the noble metals or noble metal alloys well known in the art, such as platinum or the like. The anode and cathode electrode substrates, 14 and 15, are then electrically coupled in order to provide a path for conducting electrons between the substrates 14 and 15 of adjacent cells when an external load is applied.

Still in reference to FIG. 1, fuel is supplied to the anode substrate 15 through the fuel channels 20 formed within an anode flow field plate 18, while an oxidant is supplied to the oxidant channels 19 within a cathode flow field plate 17. The anode and cathode flow field plates, 18 and 17 respectively, are formed from a solid graphite, a porous graphite, a porous graphite-polymer composite or the like. Alternatively, a fuel cell in which only one of the flow field plates 17 and 18 are porous is also contemplated and may be employed without departing from the broader aspects of the present invention. Moreover, the anode and cathode electrode substrates 14 and 15 may be treated to be either hydrophillic or hydrophobic without departing from the broader aspects of the present invention. The substrate may be flat or ribbed as is known in the art. The flow field channels may be in the flow field plate or in the substrate itself.

The fuel and oxidant together are referred to as reactants. The fuel channels 20 may be arranged approximately orthogonal to the oxidant channels 19. The fuel channels 20 and oxidant channels 19 may be engraved, milled or molded in the surface of the anode or cathode flow field plates, 18 and 17 respectively.

Figure 2:
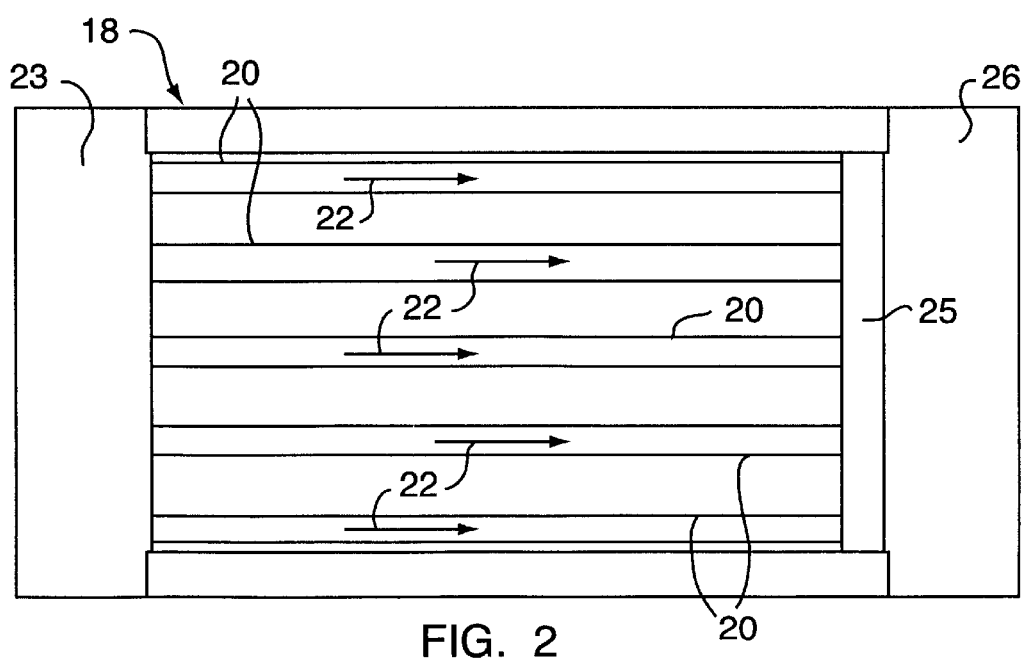
FIG. 2 is a plan view of the anode flow field plate utilized in the fuel cell assemblies of FIG. 1.

FIG. 2 is a plan view of the anode flow field plate 18 in accordance with one embodiment of the present invention. As depicted in FIG. 2, a hydrogen-rich fuel is provided to a fuel inlet manifold 23 of the fuel cell assembly 11, whereby a plurality of fuel streams 22 travel through the fuel channels 20 in a manner consistent with known single-pass arrangements. In contrast with these known single-pass arrangements, however, the fuel streams 22 do not directly exit into the fuel exhaust manifold 26, but rather are incident upon a flow restrictor 25. As illustrated in the cross-sectional view of FIG. 3, the flow restrictor 25 is oriented approximately orthogonal to the fuel channels 20 while being located adjacent the fuel exhaust manifold 26, approximately aligned with the exit edge of the anode substrate 15.

Figure 3:
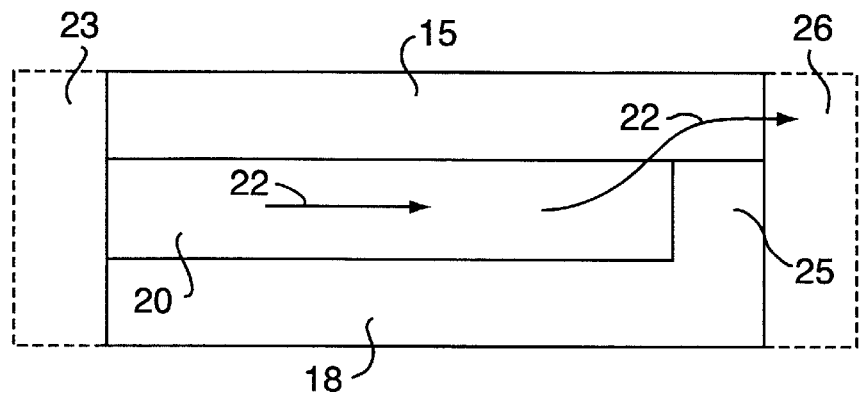
FIG. 3 is a partial cross-sectional view of a fuel channel and a flow restrictor, according to one embodiment of the present invention.
Figure 3A:
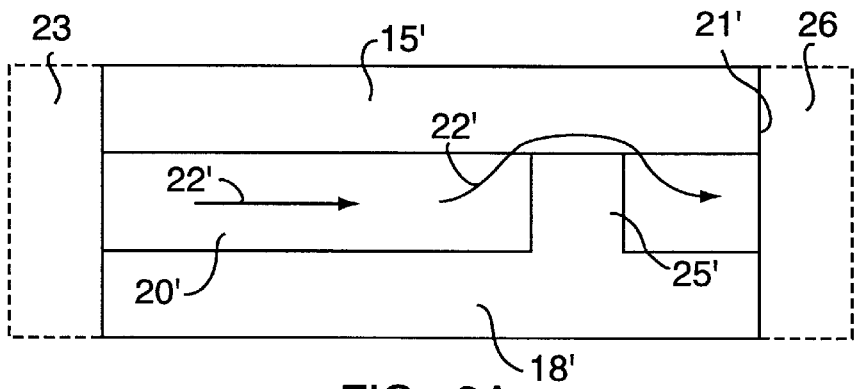
FIG. 3A is a partial cross-sectional view of a fuel channel and a flow restrictor, according to another embodiment of the present invention.
Figure 3B:
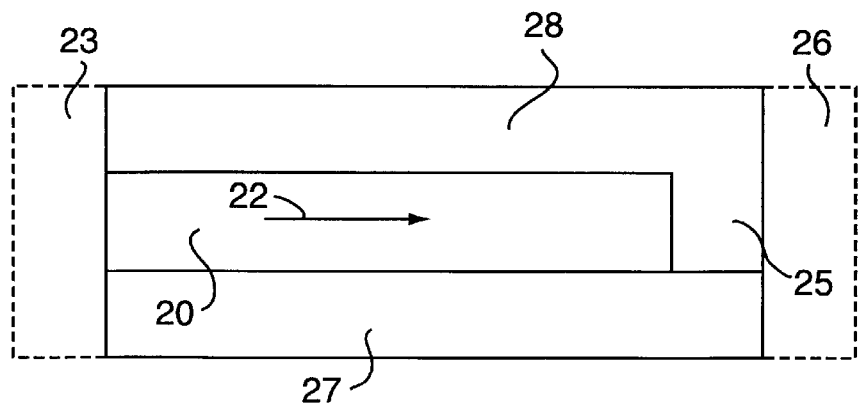
FIG. 3B is a partial cross-sectional view of a fuel channel and a flow restrictor, according to another embodiment of the present invention.

While FIGS. 2 and 3 show that the flow restrictor 25 aligned with the exit edge of the anode substrate 15, the present invention is not limited in this regard as alternative orientations of the flow restrictor 25 are contemplated without departing from the broader aspects of the present invention. FIG. 3A illustrates one such alternative orientation, wherein the flow restrictor 25' is oriented adjacent the anode flow field plate 18' and interrupts the fuel streams 22' in the fuel channels 20' at a location spaced from the exit edge 26 of the anode substrate 15'. FIG. 3B illustrates another alternative orientation, wherein a cell having a separator plate 27 contains a ribbed substrate 28 including a plurality of flow channels 22 and a flow restrictor 25 within the substrate 28.

In operation, the flow restrictor 25 of FIGS. 2 and 3 interrupts the fuel channels 20 and forces the incident fuel streams 22 to permeate the anode substrate 15 before exiting through the fuel exhaust manifold 26. As will be appreciated, by forcing the fuel streams 22 to permeate the substrate 15 and travel across the width of the flow restrictor 25, a predetermined pressure differential is created between the fuel inlet manifold 23 and the fuel exhaust manifold 26 for a given flow rate. By properly selecting the pressure differential to be used, the hydrogen utilization rate in the fuel cell assembly 11 as a whole can be raised.

Figure 4:
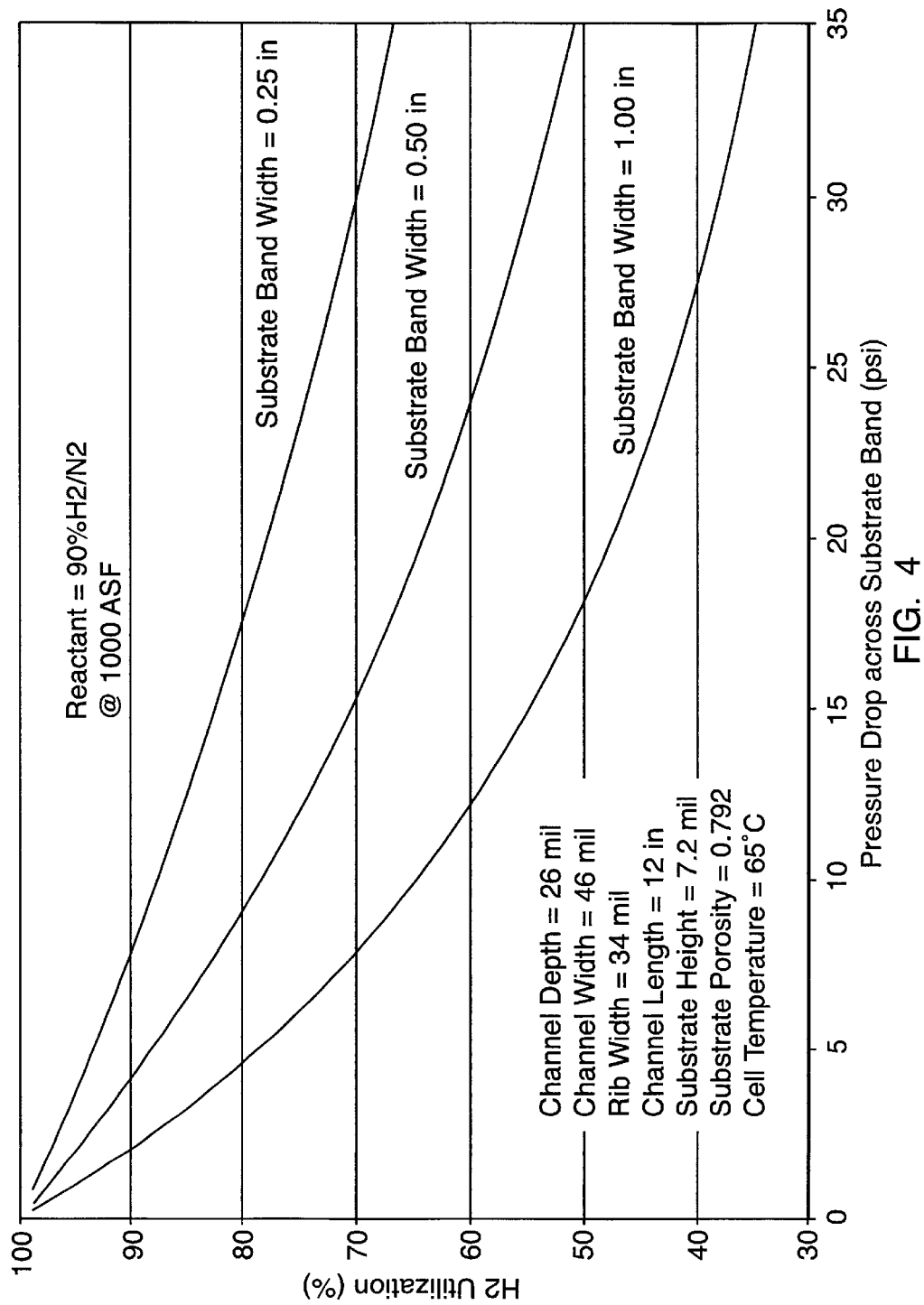
FIG. 4 is a graph illustrating the interrelationship between hydrogen utilization and the pressure drop across a flow restrictor of varying widths given a common operating current density.
Figure 5:
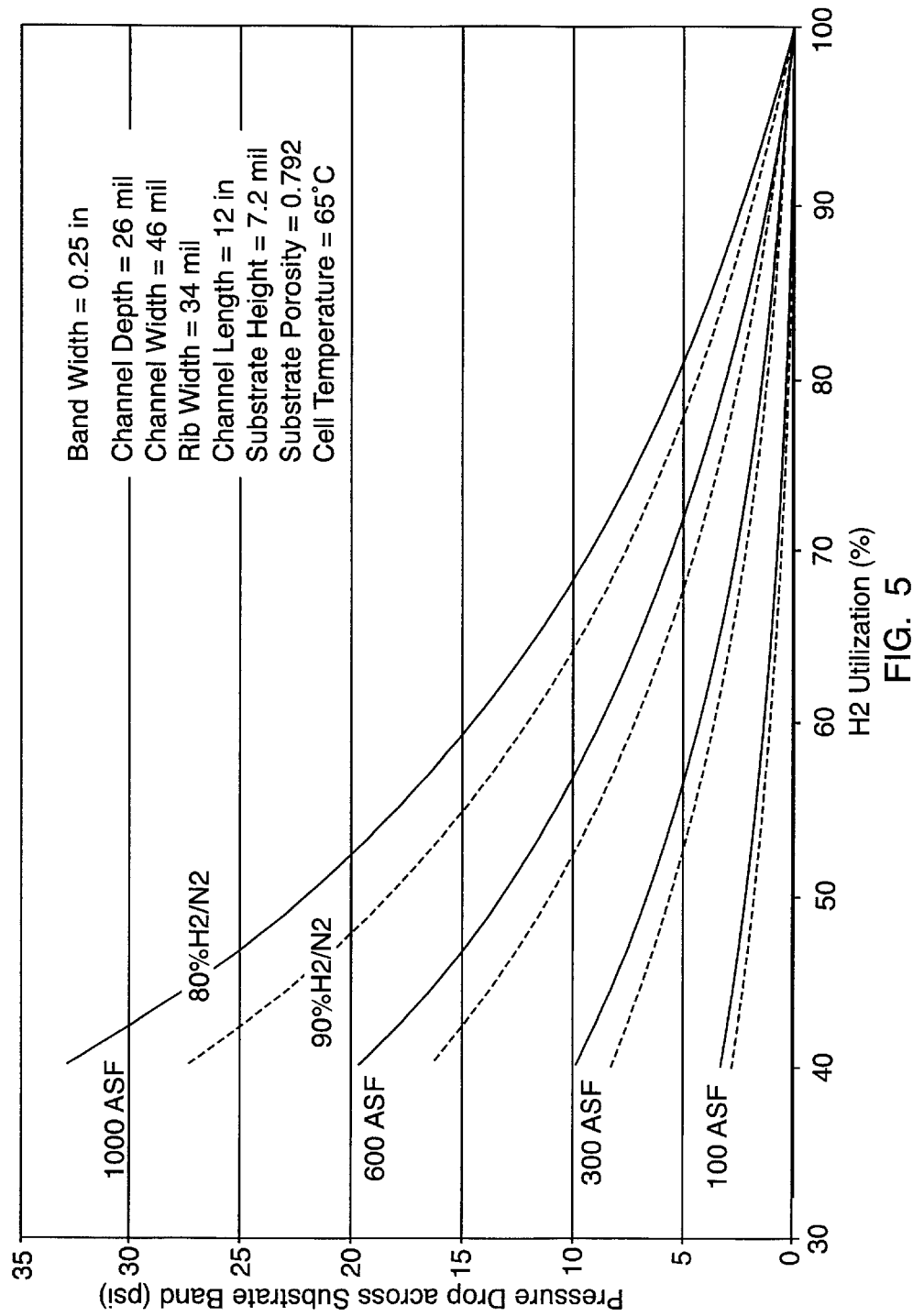
FIG. 5 is a graph illustrating the interrelationship between hydrogen utilization and the pressure drop across a flow restrictor of varying widths given differing operating current densities.

The pressure drop in the fuel stream across the flow restrictor 25 is directly proportional to the width of the flow restrictor 25, as well as the porosity and thickness of the substrate 15 and the flow rate of the fuel streams 22. As indicated by the graph shown in FIG. 4, when a flow restrictor having a width of approximately 0.25 inches and containing a substrate that is 0.0072 inches thick and 79.2% porous is employed in a fuel cell assembly being operated at a current density of approximately 1000 amps per square foot (ASF), a 95% hydrogen utilization rate can be expected given a pressure differential across the flow restrictor 25 of approximately 1.2 psi. Similar results have been obtained for fuel cell assemblies being provided with fuel streams having varied hydrogen/nitrogen ratios and being operated at a wide range of current densities, as seen by the graph shown in FIG. 5.

An important aspect of the present invention, therefore, is the ability of the present invention to employ single-pass fuel channels in a fuel cell assembly without sacrificing hydrogen utilization efficiency. Not only are such configurations easier and less costly to manufacture, but it is possible to reduce the flow rate of the fuel through the fuel channels 20, thereby enabling more efficient humidifcation of the fuel streams 22 via evaporating water from the anode flow field plate 18 or from water migrating across the PEM 13. As discussed previously, a more effective humidifcation of the fuel streams 22 corresponding lowers the possibility that differing parts of the fuel cell assembly 11, or differing fuel cell assemblies comprising a cell stack assembly, will experience drying and subsequent catastrophic failure.

Figure 6:
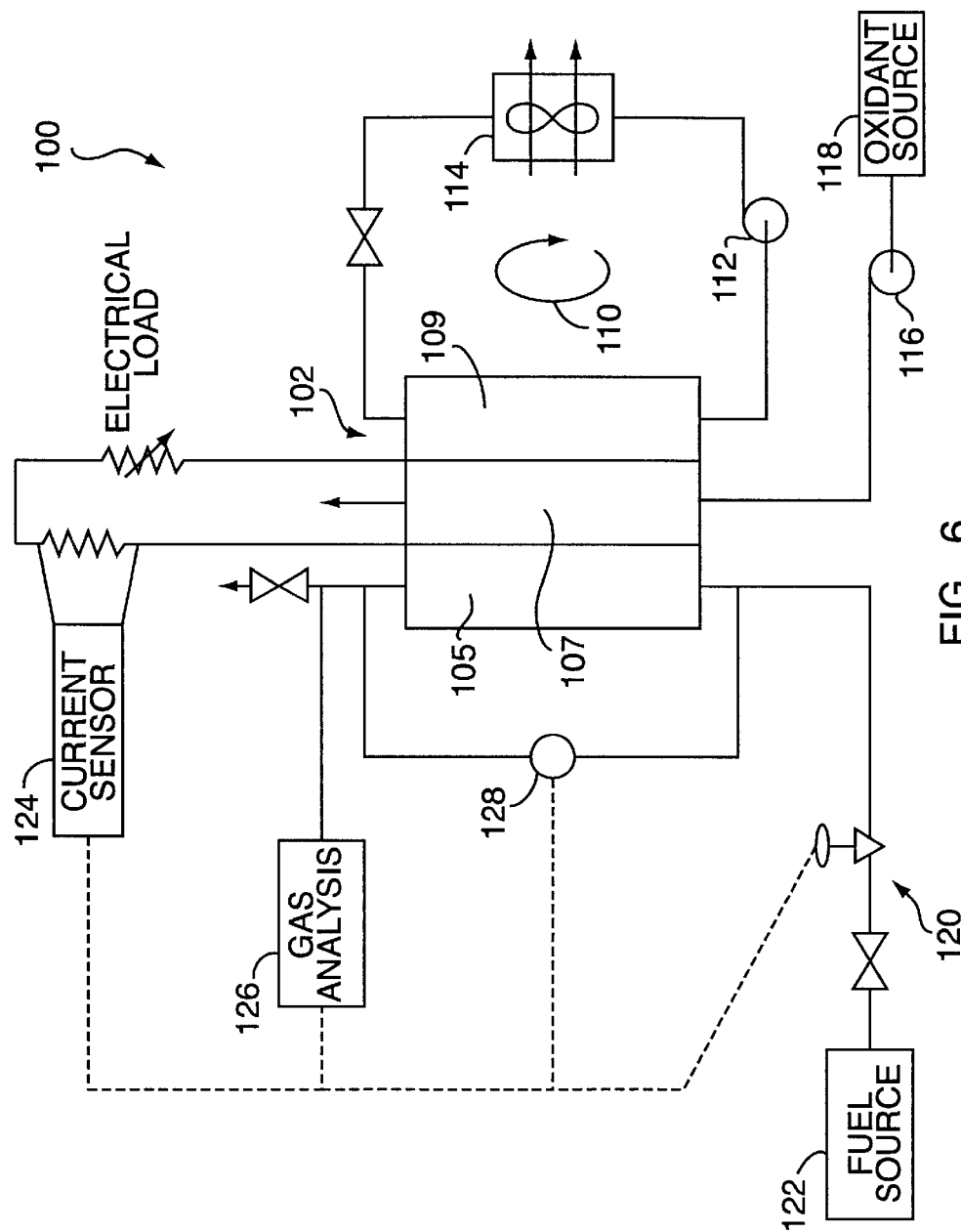
FIG. 6 is a simplified flow diagram of a fuel cell power plant employing the flow restrictor of the present invention.

FIG. 6 illustrates an integrated fuel cell power plant 100 utilizing the flow restrictors 25 of the present invention, as well as those components which may be utilized to maintain a desired pressure differential across the flow restrictors 25. As depicted in FIG. 6, a cell stack assembly 102 is represented by numeral 102 and typically comprises a plurality of planar fuel cell assemblies in electrical communication with one another. For the purposes of simplicity, only a single anode flow field 105, a single cathode flow field 107 and a single coolant plate 109 have been illustrated.

As is commonly known, a coolant loop 110 is provided with a coolant blower or pump 112 and a heat exchanging device 114 for the purposes of maintaining the operating temperature of the cell stack assembly 102 within desired parameters. A known oxidant blower or pump 116 and an appropriate oxidant supply 118 is also utilized to provide the cell stack assembly 102 with the necessary supply of an oxygen-rich oxidant. As described above, the fuel channels within the anode flow field 105 of the cell stack assembly 102 are each interrupted with an unillustrated flow restrictor to promote increased hydrogen utilization. A pressure control valve and regulator assembly 120 dynamically controls the flow of a hydrogen-rich fuel stream from a fuel supply 122 to the cell stack assembly 102 according to feedback signals received from sensors in operative communication with the cell stack assembly 102. As shown in FIG. 6, a current sensor 124, a gas analysis sensor 126 and a pressure transducer 128, or the like, may be utilized either alone or in conjunction with one another to measure appropriate operating characteristics of the cell stack assembly 102 for feedback to the pressure control valve and regulator assembly 120.

During operation of the fuel cell power plant 100, an unillustrated controller will monitor either the current sensor 124, the gas analysis sensor 126 or the pressure transducer 128, or the like, to determine if the fuel cell power plant 100 is operating within predetermined operating parameters, including a hydrogen utilization parameter. If it is determined that the fuel cell power plant 100 is operating at or below a predetermined utilization rate, the pressure control valve and regulator assembly 120 will correspondingly augment the flow or vent rate of the fuel stream as provided by the fuel supply 122.

As can be seen from the foregoing disclosure and figures in combination, the present invention utilizes a heretofore unknown flow restrictor to interrupt the fuel channels in a fuel cell assembly which establishes a uniform flow, thereby allowing for increased hydrogen utilization and substantially decreasing the incidence of catastrophic failure of the fuel cell due to dehydration.

Moreover, a fuel cell power pant which utilizes the architecture of the present invention may be relieved from incorporating a dedicated fuel recycling system to increase hydrogen utilization. By eliminating such a recycling system, significant advantages in the areas of manufacturing cost and overall volume of the fuel cell power plant may be realized. All of these attributes contribute to the efficient operation of a fuel cell power plant as a whole and are especially beneficial to those applications, such as motor vehicle propulsion systems, which demand high performance, reliability and energy efficiency in a compact arrangement.

While the invention had been described with reference to the preferred embodiments, it will be understood by those skilled in the art that various obvious changes may be made, and equivalents may be substituted for elements thereof, without departing from the essential scope of the present invention. Therefore, it is intended that the invention not be limited to the particular embodiments disclosed, but that the invention includes all embodiments falling within the scope of the appended claims.

What is claimed is:

1. A method for increasing the operational efficiency of a fuel cell power plant including a cell stack assembly comprised of a plurality of fuel cells, each of said fuel cells including an anode substrate in fluid communication with an anode flow field plate, said method comprising the steps of:

forming a plurality of fuel channels in said anode flow field plate;

providing a fuel stream to said fuel channels;

orienting a flow restrictor substantially orthogonal to said fuel channels, wherein said flow restrictor extends continuously across the width of said anode flow field plate and interrupts said fuel channels at a location along said fuel channels, wherein said fuel stream is directed to permeate said anode substrate before being exhausted from said fuel cells.

2. The method for increasing the operational efficiency of a fuel cell power plant according to claim 1, said method further comprising the steps of:

utilizing a pressure control assembly to regulate a rate at which said fuel stream is provided to said fuel channels.

3. The method for increasing the operational efficiency of a fuel cell power plant according to claim 2, said method further comprising the steps of:

sensing a pressure differential across an inlet end of said fuel channels to an exit end of said fuel channels; and communicating a control signal to said pressure control assembly in accordance with said sensed pressure differential.

4. The method for increasing the operational efficiency of a fuel cell power plant according to claim 2, said method further comprising the steps of:

sensing a chemical composition of fuel exhausted from said fuel cell assembly; and communicating a control signal to said pressure control assembly in accordance with said sensed chemical composition.

5. The method for increasing the operational efficiency of a fuel cell power plant according to claim 2, said method further comprising the steps of:

sensing current generated by said fuel cell assembly; and communicating a control signal to said pressure control assembly in accordance with said sensed current.

6. The method for increasing the operational efficiency of a fuel cell power plant according to claim 1, said method further comprising the steps of:

internally humidifying said fuel stream.

7. The method for increasing the operational efficiency of a fuel cell power plant according to claim 2, said method further comprising the steps of:

controlling said pressure control assembly to maintain a hydrogen utilization rate of said fuel cell power plant above approximately 95%.

8. A fuel cell power plant, comprising:

a cell stack assembly having a plurality of fuel cells;

an anode flow field of said fuel cells having a plurality of fuel channels formed therein, each of said plurality of fuel channels defining a continuous single-pass conduit from a fuel inlet manifold to a fuel exhaust manifold;

a flow restrictor for blocking portions of said fuel channels; and a fuel supply for providing fuel to said fuel channels wherein said fuel will become incident upon said flow restrictor and subsequently permeate said anode flow field prior to being exhausted from said fuel cell power plant.

9. A fuel cell power plant according to claim 8, wherein:

said fuel cells include a proton exchange membrane; and said fuel is a hydrogen-containing gaseous stream.

10. A fuel cell power plant according to claim 8, wherein:

said cell stack assembly includes an anode substrate in fluid communication with an anode flow field plate; and said fuel channels are formed in said anode flow field plate and extend linearly from a first side of said flow field plate to a second opposing side of said flow field plate.

11. A fuel cell power plant according to claim 10, wherein:

said anode substrate is comprised of a porous carbon fiber paper; and said fuel streams are caused to permeate said anode substrate after being incident upon said flow restrictor.

12. A fuel cell power plant according to claim 8, further comprising:

a sensor for determining an operating parameter of said fuel cell power plant and outputting data in dependence thereupon; and a controller for accepting said data and regulating said fuel supply in accordance with said data so that said fuel cell power plant maintains a predetermined hydrogen utilization rate.

13. A fuel cell power plant according to claim 12, wherein:

said predetermined hydrogen utilization rate is approximately between 95%–99%.

14. A fuel cell power plant according to claim 13, wherein:

said sensor includes one of a pressure differential sensor, a gas analysis sensor and a current sensor.

15. A fuel cell power plant according to claim 10, further comprising:

an internal humidification device for humidifying said fuel stream, wherein said anode flow field plate comprises a water transport plate including channels for distributing water over said anode flow field, said fuel channels extending along a full length of a fuel inlet edge.

16. A method for increasing the operational efficiency of a fuel cell power plant including a cell stack assembly comprised of a plurality of fuel cells, each of said fuel cells including an anode substrate in fluid communication with an anode flow field plate, said method comprising the steps of:

forming a fuel channel in said anode flow field plate, said fuel channel being continuous and extending from a fuel inlet opening to a fuel exit opening;

providing a fuel stream to said fuel channel; and interrupting said fuel channel at a location along said fuel channel, wherein said fuel stream is directed to permeate said anode substrate before being exhausted from said fuel cells.

17. A fuel cell power plant, comprising:

a cell stack assembly having a plurality of fuel cells;

an anode flow field of said fuel cells having a fuel channel formed therein, said fuel channel being continuous and extending from a fuel inlet opening to a fuel exit opening;

a flow restrictor for blocking a portion of said fuel channel; and a fuel supply for providing fuel to said fuel channel wherein said fuel will become incident upon said flow restrictor and subsequently permeate said anode flow field prior to being exhausted from said fuel cell power plant.

18. A method for increasing the operational efficiency of a fuel cell power plant including a cell stack assembly comprised of a plurality of fuel cells, each of said fuel cells including an anode substrate in fluid communication with an anode flow field plate, said method comprising the steps of:

forming a plurality of fuel channels in said anode flow field plate;

providing a fuel stream to said fuel channels;

interrupting said fuel channels at a location along said fuel channels, wherein said fuel stream is directed to permeate said anode substrate before being exhausted from said fuel cells;

utilizing a pressure control assembly to regulate a rate at which said fuel stream is provided to said fuel channels;

sensing a pressure differential across an inlet end of said fuel channels to an exit end of said fuel channels; and communicating a control signal to said pressure control assembly in accordance with said sensed pressure differential.

* * * * *